(12) United States Patent
Wyman

(10) Patent No.: US 10,423,151 B2
(45) Date of Patent: Sep. 24, 2019

(54) CONTROLLER ARCHITECTURE AND SYSTEMS AND METHODS FOR IMPLEMENTING THE SAME IN A NETWORKED CONTROL SYSTEM

(71) Applicant: BATTELLE ENERGY ALLIANCE, LLC, Idaho Falls, ID (US)

(72) Inventor: Richard P. Wyman, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 15/644,118

(22) Filed: Jul. 7, 2017

(65) Prior Publication Data

US 2019/0011904 A1    Jan. 10, 2019

(51) Int. Cl.
| | |
|---|---|
| G05B 19/418 | (2006.01) |
| G05B 19/05 | (2006.01) |
| H04L 29/08 | (2006.01) |
| G05B 19/042 | (2006.01) |
| G06F 13/12 | (2006.01) |
| B23P 21/00 | (2006.01) |

(52) U.S. Cl.
CPC .......... *G05B 19/418* (2013.01); *B23P 21/004* (2013.01); *G05B 19/0426* (2013.01); *G05B 19/054* (2013.01); *G06F 13/12* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 5,907,689 | A | * 5/1999 | Tavallaei | G06F 13/362 709/245 |
| 5,949,876 | A | 9/1999 | Ginter et al. | |
| 6,070,253 | A | * 5/2000 | Tavallaei | G06F 11/2736 709/223 |
| 6,177,808 | B1 | * 1/2001 | Heinrich | H03K 17/693 326/37 |
| 6,226,699 | B1 | * 5/2001 | Humpherys | G06F 13/4068 710/100 |
| 6,633,878 | B1 | * 10/2003 | Underwood | G06Q 10/10 |
| 7,346,813 | B1 | * 3/2008 | Schulz | G06F 11/2268 714/26 |
| 7,376,760 | B1 | * 5/2008 | Ivchenko | G05B 19/4183 702/108 |

(Continued)

FOREIGN PATENT DOCUMENTS

EP    2866407 A1    4/2015

OTHER PUBLICATIONS

Anderson et al., "Cyber-Informed Engineering: The Need for a New Risk Informed and Design Methodology", International Conference on Computer Security in a Nuclear World: Expert Discussion and Exchange, INL/CON-15-34244 (Jun. 2015) 11 pages.

(Continued)

*Primary Examiner* — Crystal L Hammond
(74) *Attorney, Agent, or Firm* — TraskBritt

(57) ABSTRACT

An architecture for a control system in a network, and devices and techniques for implementing the same. The architecture may comprise a logic controller isolated from the network by an interface controller and a bridge interface between the interface controller and the logic controller.

16 Claims, 15 Drawing Sheets

(56) References Cited

U.S. PATENT DOCUMENTS

| | | | | |
|---|---|---|---|---|
| 7,487,283 | B2* | 2/2009 | Sivertsen | G06F 13/409 |
| | | | | 710/301 |
| 8,667,589 | B1 | 3/2014 | Saprygin et al. | |
| 9,094,401 | B2 | 7/2015 | Mraz | |
| 9,280,664 | B2 | 3/2016 | Lee et al. | |
| 2002/0097851 | A1* | 7/2002 | Daum | H04L 29/06 |
| | | | | 379/102.03 |
| 2004/0138786 | A1* | 7/2004 | Blackett | G01D 4/00 |
| | | | | 700/295 |
| 2005/0025119 | A1* | 2/2005 | Pettey | H04L 49/25 |
| | | | | 370/351 |
| 2005/0085193 | A1 | 4/2005 | Stromberg et al. | |
| 2005/0104852 | A1* | 5/2005 | Emerson | G06F 3/038 |
| | | | | 345/157 |
| 2007/0061455 | A1* | 3/2007 | Callaghan | H04L 63/08 |
| | | | | 709/225 |
| 2012/0066430 | A1* | 3/2012 | Cooper | G06F 13/4022 |
| | | | | 710/316 |
| 2013/0294240 | A1* | 11/2013 | Suni | H04W 28/10 |
| | | | | 370/235 |
| 2015/0222517 | A1 | 8/2015 | McLaughlin et al. | |
| 2015/0271161 | A1 | 9/2015 | Katsuta | |
| 2015/0326475 | A1* | 11/2015 | Cj | H04L 61/103 |
| | | | | 370/392 |
| 2015/0346706 | A1* | 12/2015 | Gendelman | G05B 19/058 |
| | | | | 700/79 |
| 2015/0378339 | A1 | 12/2015 | Ji | |
| 2016/0041535 | A1 | 2/2016 | Leonardi et al. | |
| 2016/0065603 | A1 | 3/2016 | Dekel et al. | |
| 2016/0117158 | A1 | 4/2016 | MacCleery et al. | |
| 2016/0154673 | A1* | 6/2016 | Morris | G06F 9/5027 |
| | | | | 718/100 |
| 2016/0269363 | A1 | 9/2016 | Southerland | |
| 2016/0285830 | A1* | 9/2016 | Dong | H04L 63/0263 |
| 2016/0378443 | A1 | 12/2016 | Sun et al. | |
| 2016/0381051 | A1* | 12/2016 | Edwards | H04L 63/1416 |
| | | | | 726/23 |
| 2017/0006047 | A1 | 1/2017 | Bharadwaj et al. | |
| 2017/0078455 | A1* | 3/2017 | Fisher | H04L 69/03 |
| 2017/0085588 | A1 | 3/2017 | Laidlaw et al. | |
| 2017/0103209 | A1* | 4/2017 | Wooten | G06F 9/4406 |
| 2017/0318570 | A1* | 11/2017 | Shaw | H04L 5/0053 |
| 2017/0339247 | A1* | 11/2017 | Tiwari | H04L 67/2833 |
| 2018/0225230 | A1* | 8/2018 | Litichever | G06F 21/56 |
| 2018/0332004 | A1* | 11/2018 | Drako | H04L 63/0218 |

OTHER PUBLICATIONS

Assante et al., "The Case for Simplicity in Energy Infrastructure—For Economic and National Security", Center for Strategic & International Studies, Strategic Technologies Program (Oct. 2015) 8 pages.

Cusimano et al., "Integrating Industrial Control system (ICS) Cybersecurity with Process Safety Management—Why modern process safety programs must incorporate ICS security assessments", aeSolutions (2016) 5 pages.

Gao et al., "SCADA communication and security issues", Security and Communication Networks, vol. 7, Issue 1, (Jan. 2014) pp. 175-194.

Vasudevan et al., "CARMA: A Hardware Tamper-Resistant Isolated Execution Environment on Commodity x86 Platforms", ASIACCS (2012) 5 pages.

Wyman, Richard, "Consider the consequences: A powerful approach for reducing ICS cyber risk", Cyber Security: A Peer-Reviewed Journal, vol. 1, No. 1 (Jan. 2017) 17 pages.

* cited by examiner

CONTROLLER ARCHITECTURE AND SYSTEMS AND METHODS FOR IMPLEMENTING THE SAME IN A NETWORKED CONTROL SYSTEM

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

The embodiments of the present disclosure relate generally to a control system architecture and systems and methods for operating control systems as part of a network.

BACKGROUND

Industrial control systems (ICSs) are sometimes referred to as cyber/physical systems (CPSs). ICSs rely on a cyber infrastructure for collecting data, making control decisions, providing an interface for the operator, storing information, issuing alarms, and many other uses. A main use of these systems, however, is to change the state of equipment under control (EUC), which equipment resides in the physical domain. The infrastructure for performing these activities ranges from a simple controller for turning on zones of a lawn sprinkler to computers, networks and controllers for chemical processing, refining oil or processing wastewater.

One model used to describe the relationship between ICS subsystems and the enterprise network is the Purdue reference model. Level 0 is the process layer including the EUC (e.g., motors, valves, actuators, fans) and sensors (e.g., pressure, flow, level, temperature, alarms, status). Level 1 is basic control, and may include controllers such as programmable logic controllers (PLCs), remote terminal units (RTUs), intelligent electronic devices (IEDs), programmable automation controllers (PAC), and distributed controllers. Level 2 is supervisory control, and includes workstations, operator stations, servers, and the like, in a central location that receives data and generates commands and alarms.

The controllers at the basic control level (Level 1) typically perform three functions: provide input/output (I/O), control the process layer (Level 0), and communicate with Level 3 supervisory control components. Within these functions, the controllers at the basic control level incorporate protective logic to monitor operating parameters and, potentially engage in protective action to mitigate effects of uncontrolled processes.

Threats to industrial control systems cyber risk are typically analyzed in terms of a threat actor, a vulnerability and an impact to a target. In the industrial control system (ICS) context, a threat actor exploits vulnerabilities in an ICS and maliciously manipulates the system or prevents control system actions to cause physical consequences. With the advent of networking and the ability of threat actors to remotely access and manipulate an ICS, risk analysis has focused on analyzing and eliminating or mitigating vulnerabilities to protect the systems. Vulnerabilities are known to come in multiple forms including computer/networking, physical, and social. Computer vulnerabilities may include malicious network attacks, viruses, Trojan horses, bugs and exploits in software. Social vulnerabilities may include poor training, unsecure management of credentials, and spear phishing attacks. Physical vulnerabilities may include weak physical security infrastructure.

BRIEF SUMMARY

Various embodiments of the disclosure relate, generally, to a control system. The control system may include an interface controller, a logic controller, and a bridge interface. The interface controller may be configured to receive one or more commands over a network interface. The logic controller may be configured to provide one or more control signals to equipment. The bridge interface may couple the interface controller and the logic controller and isolate the logic controller from the network interface.

Other embodiments of the disclosure relate, generally, to a bridge interface. The bridge interface may include a first unidirectional communication channel and a second unidirectional communication channel. The first unidirectional communication channel may be configured to transfer commands from an interface controller to a logic controller. The second unidirectional communication channel configured to transfer data from the logic controller to the interface controller. According to one aspect of these embodiments, the first unidirectional communication channel and the second unidirectional communication channel are isolated from at least some of the system components of the logic controller and the network interface controller, respectively.

Other embodiments of the disclosure relate, generally, to a logic controller. The logic controller may include a main memory, an input/output and an interface. The main memory may have one or more of a protective logic and a process logic stored thereon. The input/output may be configured to output one or more control signals generated by a processor executing one or more of the protective logic and the process logic responsive to one or more setpoint commands and/or inputs (process measurements, local commands, equipment state, etc.). The interface may isolate one or more of the protective logic and the process logic from a network appliance that is operably coupled to the process controller and provides the one or more commands.

Other embodiments of the disclosure relate, generally, to control methods. The methods may include receiving a command associated with a controlled process at a network device; generating at least one conditioned command responsive to the received command; and providing the conditioned command to a controller across an interface that limits the network device's access to the controller.

Other embodiments of the disclosure relate, generally, to a control system. The control system may include a first interface controller, a second interface controller, and a bridge interface. The first interface controller may be configured to receive one or more data packets over a first network interface. The second interface controller may be configured to receive one or more data packets over a second network interface. The bridge interface may couple the first interface controller and the second interface controller and isolate the first interface controller from the second network interface and isolate the second interface controller from the first network interface.

BRIEF DESCRIPTION OF THE DRAWINGS

Purposes and advantages of the embodiments of the disclosure will be apparent to one of ordinary skill in the art from the detailed description in conjunction with the appended drawings, including.

DETAILED DESCRIPTION

Figure 1:
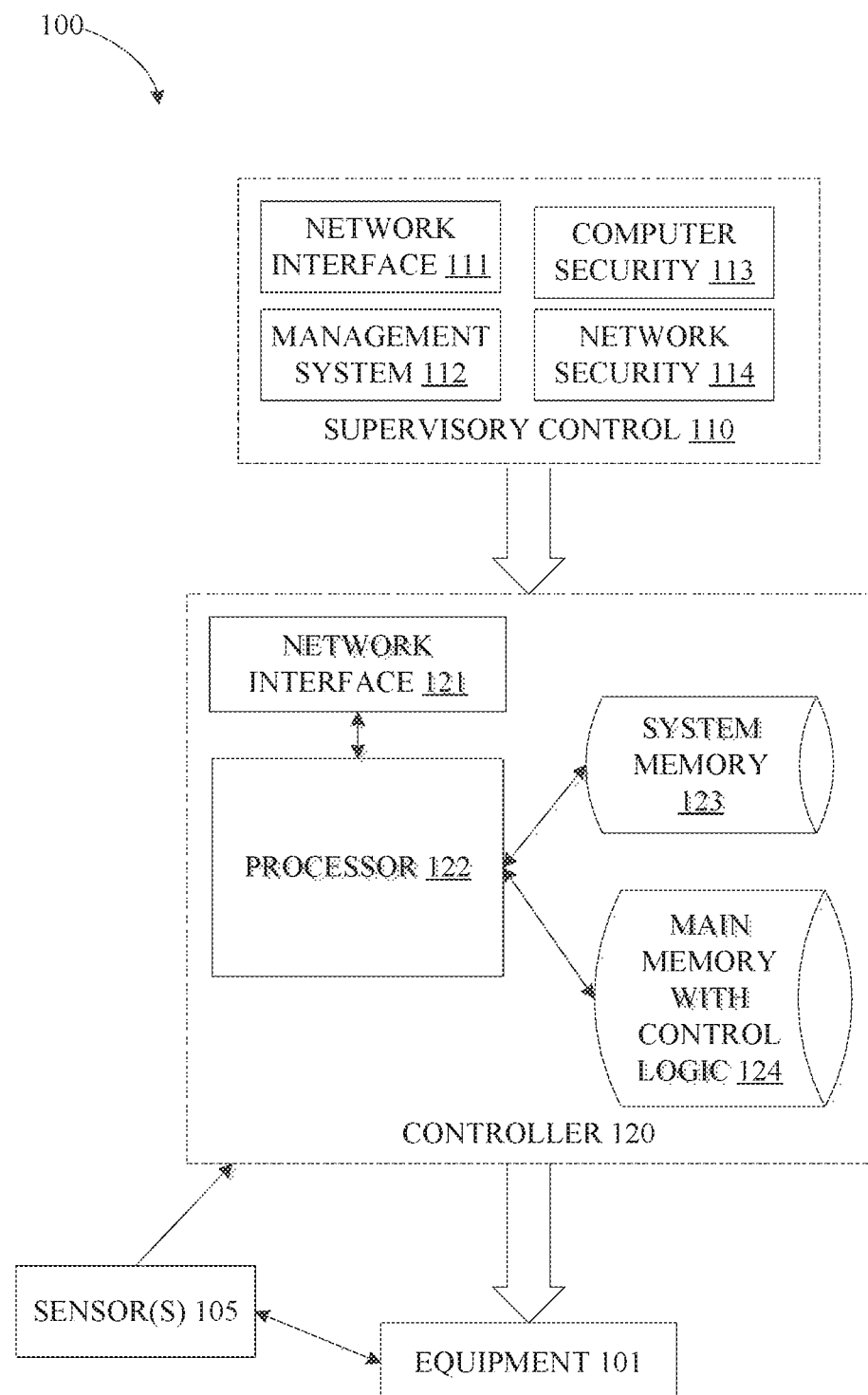
FIG. 1 shows a control system that is representative of the state of the art.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure. The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are by way of example only and should not be construed as the only way to implement the present disclosure unless specified otherwise herein. Additionally, block definitions and partitioning of logic between various blocks is/are examples of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Many of the functional units described in this specification may be illustrated, described or labeled as logic, modules, threads, or other segregations of programming code, in order to more particularly emphasize their implementation independence in accomplishing the features, functions, tasks or steps that are generally described herein. The various illustrative logical blocks, modules, and circuits described in connection with the embodiments disclosed herein may be at least partially implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

These logic and modules may also be implemented using software or firmware, stored on a computer readable storage medium, in system memory, or a combination thereof for execution by various types of processors.

In the case of a general purpose computer, these logic and modules may be embodied in software classes and applications executed by processor cores, and while the modules are executing the general purpose computer may be thought of as a special purpose computer or a specific purpose computer. The logic and modules may also relate to specific purpose hardware, including the firmware and machine code, controlling its operation. An identified module of executable code may, for instance, comprise one or more physical or logical blocks of computer instructions, which may, for instance, be organized as a thread, object, procedure, or function. Nevertheless, the executable of an identified module need not be physically located together, but may comprise disparate instructions stored in different locations which, when joined logically together, comprise the module and achieve the stated purpose for the module.

A module of executable code may comprise a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer readable media.

In some embodiments, the software portions are stored in a non-transitory state such that the software portions, or representations thereof, persist in the same physical location for a period of time. Additionally, in some embodiments, the software portions are stored on one or more non-transitory storage mediums, which include hardware elements capable of storing non-transitory states and/or signals representative of the software portions, even though other portions of the non-transitory storage mediums may be capable of altering and/or transmitting the signals. Examples of non-transitory storage mediums are flash memory and random-access-memory (RAM). Another example of a non-transitory storage medium includes a read-only memory (ROM) which can store signals and/or states representative of the software portions for a period of time. However, the ability to store the signals and/or states is not diminished by further functionality of transmitting signals that are the same as, or representative of, the stored signals and/or states. For example, a processor may access the ROM to obtain signals that are representative of the stored signals and/or states in order to execute the corresponding software instructions.

A general-purpose processor (which may also be characterized herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer when the general-purpose computer is configured to execute computing instructions (e.g., software code) related to embodiments of the present disclosure.

The embodiments disclosed herein may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Various embodiments described herein may include elements described as implemented in a "workstation," "computer," or a "computer system." Here, the terms "workstation," "computer," and "computer system" are to be understood to include at least one non-transitory computer readable medium and at least one processing unit. In general, the storage medium will store, at one time or another, at least portions of an executable program code, and the processor(s) will execute one or more of the instructions included in that executable program code. It will be appreciated that the term "executable program code" and the term "software" mean substantially the same thing for the purposes of this description. It is not necessary to the practice of the various embodiments described herein that the storage medium and the processing unit be physically located in the same place. That is to say, it is foreseen that the processor and the memory might be distributed among physical pieces of equipment or even in geographically distinct locations. One of ordinary skill in the art will appreciate that "media", "medium", "storage medium," "computer-readable media", or "computer readable medium" as used here, may include a diskette, a magnetic tape, a digital tape, a compact disc, an integrated circuit, a ROM, a CD, DVD, Blu-Ray, a cartridge, flash memory, PROM, a RAM, a memory stick or card, or any other non-destructive storage medium useable by computers, including those that are re-writable.

Although the enabling software might be "written on" a disc, "embodied in" an integrated circuit, "carried over" a communications circuit, "stored in" a memory chip, or "loaded in" a cache memory, it will be appreciated that, for the purposes of this disclosure, the software will be referred to simply as being "in" or "on" a main memory that is a computer readable medium. Thus, the terms "in" or "on" are intended to encompass the above mentioned and all equivalent and possible ways in which software can be associated with a computer readable medium.

Users may interact with the computer systems described herein by way of graphical user interfaces (GUI) on a display and input devices such as touchscreens, keyboards, a computer mouse, touchpads, buttons, switches, jumpers, and the like. A GUI may include a console and/or dashboard and a user may interact with the GUI and, in-turn, underlying software applications.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1).

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The understanding has been that the controllers at the basic control level (Level 0) are difficult to exploit because they previously ran in trusted environments. However, in a networked environment, it is now understood that the controllers at the basic control level are vulnerable to techniques for influencing the physical domain. In particular, since the control logic and process inputs used to generate control outputs typically reside in the same controller they are directly exposed to network attacks.

By way of non-limiting example, an attacker who wants to cause a physical impact on a process may try to prevent legitimate control commands from reaching EUC or exploit a control system to issue unauthorized/compromised commands to EUC. Techniques that an attacker may use to prevent legitimate control commands from reaching the EUC may include preventing an operator from issuing setpoint commands with a denial of service (DoS) attack on operator workstations, or stopping/disabling a controller's protective logic or process logic. The impact in the event of a substantial loss of control may be very serious, especially if the protective logic is poorly designed, altered or disabled.

At the physical level, an attacker may try to initiate an unauthorized state change that shuts down a process in an uncontrolled manner, or issue malicious setpoint commands that create a process excursion that damage equipment or impairs a process. An attacker can produce an abusive set of control commands that causes equipment failures, for example, cycling control commands to burn up a motor or pump. The protective logic may prevent malicious setpoints from causing physical damage unless an attacker bypasses or disables the protective logic in the controller.

One option is to implement protection measures in external non-cyber devices that cannot be hacked. However, such an approach lacks the flexibility, features and functions of a digital controller. While physical (non-cyber) protections could be inserted into the control loop to provide interlocks and protection layers to prevent all possible impacts caused by a cyber-attack, such an approach would become unwieldy and difficult to implement. Further, a threat actor with physical access to a facility could disable or vandalize these physical protections, impairing or destroying their ability to protect processes.

Generally, the embodiments described herein combine barriers to safeguard protective logic and process logic found in physical interlocks and protection layers external to the cyber system with the flexibility and cost savings of running protective logic and process logic in a digital controller that is part of a networked control system. Further, various embodiments of the controller design include physically securing programming ports and using robust passwords to reduce the likelihood of local tampering of the controller.

FIG. 1 illustrates a prior art control system 100 that is vulnerable to techniques for influencing the physical domain. The system 100 includes a supervisory control 110, a controller 120, and equipment 101. The supervisory control 110 includes a network interface 111, a management system 112, and computer and network security features 113 and 114. The supervisory control 110 is configure to provide supervisory commands to the controller 120, including commands that relate to the equipment 101. The controller 120 also processes inputs from the sensors 105 which measure the state of the process. The controller 120 includes a network interface 121, a processor 122, system memory 123 and control logic 124. The control logic 124 includes process control logic and protective logic. The controller 120 is configured to receive the supervisory commands and provide control signals to the equipment 101. The communication channel of the network interface 121 and control logic 124 share access to a common CPU, memory, and data bus that exposes the control logic 124 to network exploits.

In the system 100, if an attacker bypasses the computer and network security features 113 and 114 then they may issue fake and/or malicious supervisory commands to the controller 120. Further, if the attacker has information about the architecture of the controller 120, by way of non-limiting example, that it has a network interface 121 and a system memory 123, the attacker may be able to utilize exploits to hijack the controller 120 or circumvent protective logic in the control logic 124. If the primary or only protective logic for preventing equipment damage runs in the Level 1 controller 120, the impact may be severe.

Figure 2:
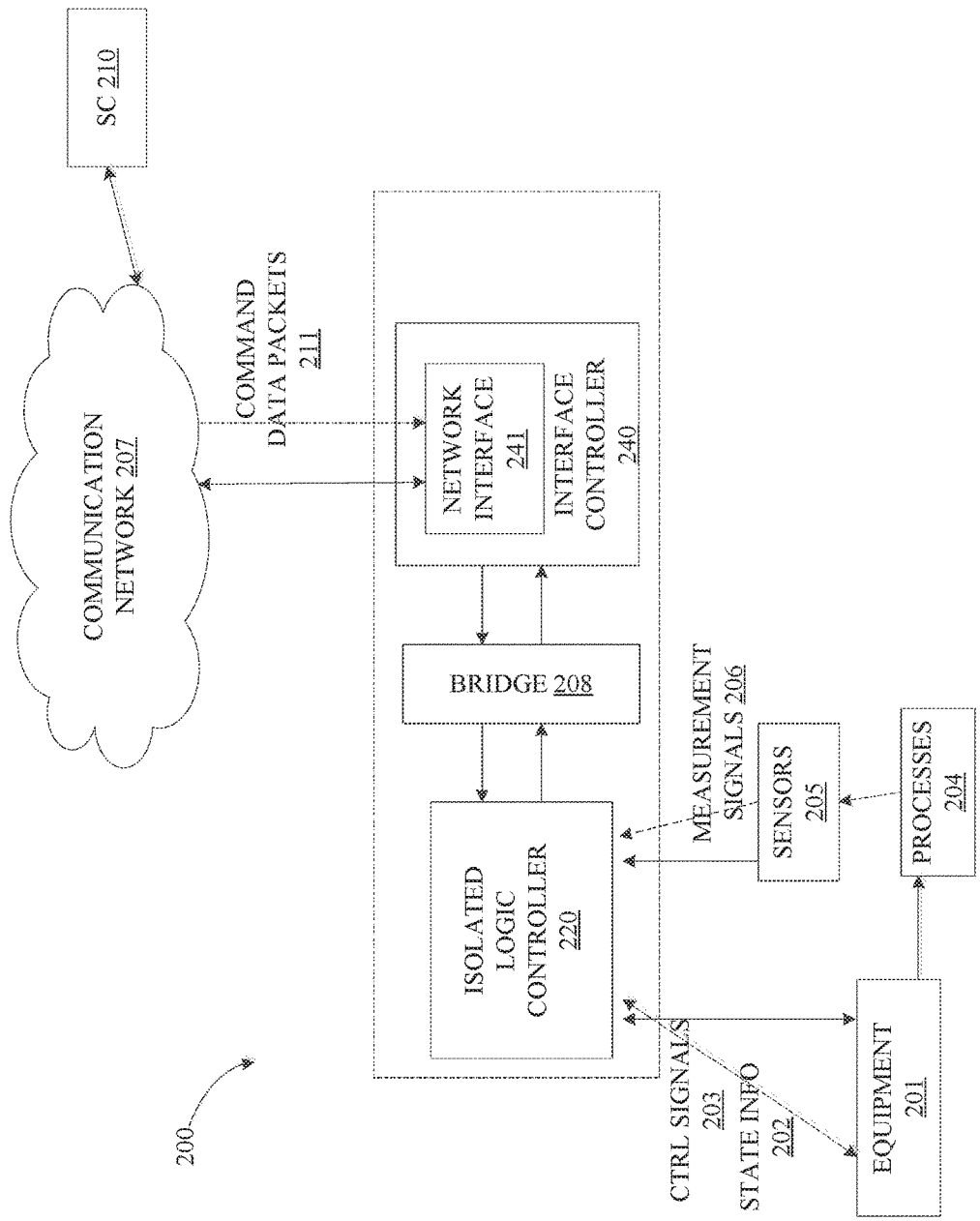
FIG. 2 shows a block diagram of a control system in accordance with an embodiment of the disclosure.

FIG. 2 illustrates a control system 200 in accordance with an embodiment of the disclosure. The control system 200 includes a supervisory control SC 210, an isolated logic controller (ILC) 220, an interface controller 240, equipment 201, sensors 205, processes 204, and a communication network 207. The interface controller 240 includes a network interface 241 that is coupled to the communication network 207. According to one aspect, the ILC 220 and interface controller 240, in combination, may be considered to be implementing a digital controller.

In various embodiments, the ILC 220 is coupled with equipment 201, and is configured to provide control signals 203 to the equipment 201 and further configured to receive state information 202 from the equipment 201. ILC 220 is also coupled with sensors 205 and configured to receive measurement signals 206 from the sensors 205. The measurement signals 206 may be indicative of one or more measurable values detected at the sensor 205. The ILC 220 is separated from the interface controller 240, and has its own system level resources and I/O that is isolated from the network interface 241 and the communication network 207. If the interface controller 240 is compromised, an attacker may, by way of non-limiting example, interact with the ILC 220 through control commands sent to the ILC 220 from the interface controller 240. However, the system level resources of the ILC 220 are isolated from the communication network 207 and data packets 211 on the physical, network, and electrical layers.

In various embodiments, the ILC 220 and interface controller 240 may communicate using analog, discrete, or digital signals. In one embodiment, the ILC 220 and interface controller 240 may communicate using serial or parallel board level communication interfaces, by way of non-limiting example, peripheral interface (SPI) bus, a joint test action group (JTAG) interface, serial digital interface (SDI), an inter-integrated circuit (I2C) bus, parallel ATA, S-100, microchannel, multibus, SBus, computer automated measurement and control (CAMAC), industry standard architecture (ISA), or similar architectures. In one embodiment, the ILC 220 and the interface controller 240 may utilize two one-way communication lines.

In one embodiment the ILC 220 and the interface controller 240 may communicate over a bridge 208 that implements one of the protocols described, above. In one embodiment, the architecture of the bridge 208 may be selected to limit the communication between the ILC 220 and the interface controller 240 to command elements of a control command. In one embodiment, the command elements are the smallest definable command elements supported by the bridge 208. In one embodiment, one or more of the smallest definable command elements may be setpoint or parts of or related to setpoint commands, and may include target values or values for operational variables, parameters that are indicative of target values or operational variables, and/or signals indicative of the foregoing.

In one embodiment, the bridge 208 may be an analog circuit. In this embodiment, the ILC system memory 228 and the interface controller 240 may communicate across an I/O interface using analog signals, by way of non-limiting example, 4-20 mA, 1-5 v, etc.

Figure 3:
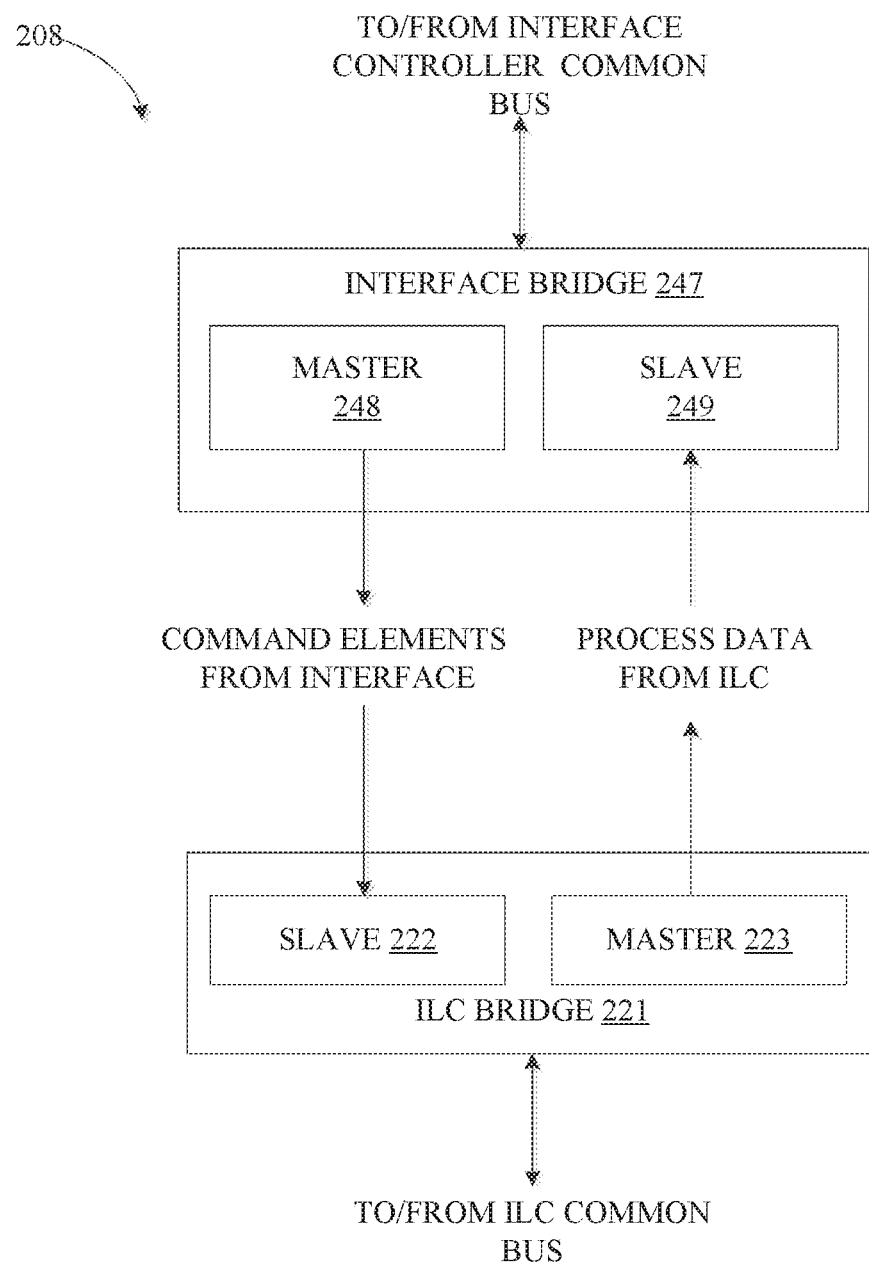
FIG. 3 shows a block diagram of a bridge coupling an isolated controller to an interface controller in accordance with an embodiment of the disclosure.

FIG. 3 illustrates an embodiment of a bridge 208 that facilitates communication between an ILC 220 and an interface controller 240. The bridge 208 comprises an interface bridge 247 and an ILC bridge 221. The ILC bridge 221 comprises a slave 222 and a master 223. The interface controller bridge 247 comprises a master 248 and a slave 249. In one embodiment, the master 248/slave 222 and the master 223/slave 249 are integrated circuits (IC) for synchronous bi-directional communication between the ILC 220 and the interface controller 240.

In one embodiment, the master 223 and master 248 may be configured to provide clocking signal to the slave 222 and slave 249 to push data and/or commands to the slave modules.

The master 248 in the interface controller 240 may be configured to provide one or more command elements to the slave 222 in the ILC bridge 221. In one embodiment, the slave 222 may have direct access to system memory of the ILC 220 and command elements may be provided directly to the ILC 220's system memory where they are accessible by the ILC 220 process control logic. Providing command elements directly to system memory and establishing one-way data transfers further facilitates isolation between the ILC 220 and the interface controller 240, limiting an attacker's ability to compromise control logic. In one embodiment, the system memory may comprise one or more addresses associated with one or more control commands. Data stored at one of the addresses implies an associated command. In one embodiment fields of one or more tables may associate one or more address spaces to one or more commands for an equipment 201. In one embodiment, the tables may be incorporated into the process logic 226.

The master 223 in the ILC 220 may be configured to provide process data to the slave 249 of the interface bridge 247. In one embodiment, the slave 249 has direct access to system memory of the interface controller 240 and process data may be provided directly to the interface controller 240's system memory where it is accessible by the interface controller 240. Providing process data directly to system memory and establishing one-way data transfers further facilitates isolation between the ILC 220 and the interface controller 240.

Figure 4:
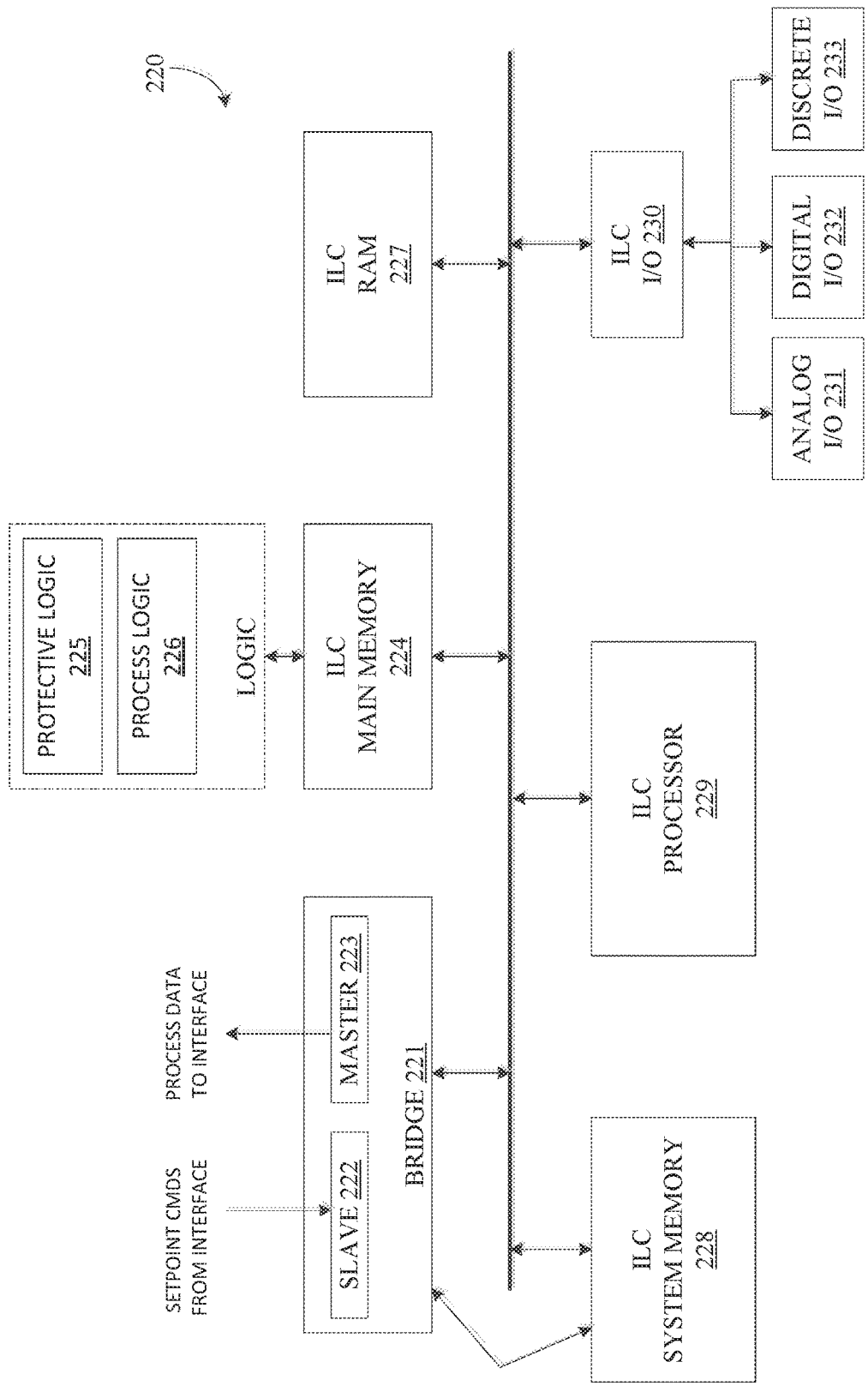
FIG. 4 shows a block diagram of an isolated logic controller in accordance with an embodiment of the disclosure.

FIG. 4 illustrates an ILC 220 in accordance with an embodiment of the disclosure. The ILC 220 may include one or more of an ILC bridge 221, an ILC main memory 224, an ILC RAM 227, an ILC processor 229, and ILC system memory 228 and an ILC I/O 230. The ILC I/O 230 may include one or more of an analog I/O 231, digital I/O 232, and discrete I/O 233.

As noted, the components of the ILC 220 are isolated from the interface controller 240 and network interface 241. In one embodiment, the ILC main memory 224 may have stored thereon one or more instructions (e.g., in object code format) to enable the ILC processor 229 to execute protective logic 225, for example, software to monitor and control according to operating parameters, protect the process and process equipment (e.g., activate valves, motors, breakers), mitigate effects of uncontrolled processes, and review supervisory/external control signals based on potential impact on equipment and processes under supervision and respond accordingly (e.g., interlocks prevent this action and that action if conditions are present).

Advantage of the architecture is that process logic, protective logic, and any other logic stored in the ILC is protected and the logic can be more robust and systems may rely on more. More control decisions may be in the ILC instead of the supervisory controller. By way of non-limiting example, artificial intelligence (AI), guided AI, etc. may be incorporated into the controller (hardware and software).

The ILC main memory 224 may also have stored thereon one or more instructions (e.g., in object code format) to enable the ILC processor 229 to execute process logic 226, for example, software to manage communication among the control system 200, for example, rules engines for providing process information and real-time data to the interface controller 240 and/or other workstations or devices in or connected to the control system 200. It is specifically contemplated that additional logic may be included in the ILC 220, it is not limited to just the process logic 226 and protective logic 225.

The various embodiments of the ILC 220 and interface controller 240 may be considered to "bridge" the network domain of the communication network 207 and the physical domain of the equipment 201. In various embodiments, the ILC I/O 230 may include inputs and outputs configured to receive and send signals between the ILC 220 and the equipment 201. The input and outputs may include one or more of analog I/O 231, digital I/O 232, and discrete I/O 233, configured to receive discrete signals, analog signals, digital signals, and combinations thereof.

In embodiments comprising discrete signals, the ILC I/O 230 may include one or more discrete I/O 233 as discrete inputs configured to receive the discrete signals. The discrete signals may be binary, for example, a discrete input signal from the equipment 201 to the ILC 220 may be: "on" or "off," "open" or "closed," in an alarm state or a normal state. By way of non-limiting example, a discrete signal may be received from a sensor 205 or equipment 201, and may indicate state information 202 indicative of one or more states of the equipment 201. The discrete signal may be responsive to a process change that causes, e.g., a switch to complete or break a circuit related to the equipment 201 or a status of the process. A circuit may be monitored by the discrete I/O 233 as a discrete input channel of the ILC I/O 226, which is interpreted by the ILC processor 229 executing the process logic 226, e.g., a pump is running or a high-level switch is in alarm state. The ILC I/O 230 may also be configured to provide one or more control signals 203 as discrete output signals to the equipment 201. By way of non-limiting example, the control signals 203 may be used to activate or deactivate an internal mechanical or electronic relay in the ILC I/O 230 that closes or opens an electrical circuit. The equipment 201 may turn on or off responsive to the state of the electrical circuit which is either energized or de-energized.

Embodiments may comprise analog signals received at one or more analog I/O 231 comprising one or more analog inputs and outputs. In one embodiment sensors coupled to transmitters, which may also be characterized merely as "transmitters" for providing measurements (e.g., for pressure, flow, speed, temperature, position, level, etc.), may generate variable analog signals (e.g., 4 to 20 mA, 1 to 5 volts, etc.), by way of non-limiting example, in proportion to a measured value of a process variable. One or more of the transmitters may comprise, by way of non-limiting example, any of the various forms of detectors and transducers used to detect measurable parameters associated with controlled processes known by those having ordinary skill in the art. The transmitters provide the analog signals to the analog I/O 231. In one embodiment, the ILC I/O 230 may comprise an analog-to-digital converter (ADC) that converts the analog signal to digital signal (e.g., for use by the ILC processor 229 executing the protective logic 225 and/or process logic 226). In another embodiment, the ILC I/O 230 may condition the analog signal and provide it to the Interface controller 240, which comprises an ADC to convert the conditioned analog signal to a digital signal.

In embodiments having one or more analog outputs, ILC I/O 230 may be configured to convert a digital signal to an analog signal, such as a variable analog signal, using a digital-to-analog (DAC) converter. In another embodiment, the ILC 220 may be configured to receive a conditioned signal from the interface controller 240 and convert some or all of the conditioned signal into one or more analog signals. In one embodiment, the analog I/O 231 may be configured to transmit a control signal 203 to the equipment 201 in the form of a setpoint control, e.g., open the valve to X % of range. In another embodiment, the ILC 220 may be configured to receive one or more measurement signals 206 indicative of a measurable value associated with controlled processes 204. The ILC I/O 230 may be configured to provide one or more control signals 203 to the equipment 201 responsive to analysis performed by the ILC processor 229 executing the protective logic 225 and/or the process logic 226.

In embodiments comprising digital signals, the ILC I/O 230 may include one or more digital I/O 232 implementing one or more protocols, by way of non-limiting example, Foundation Fieldbus, Profibus, DeviceNet, or another device-level protocol, and combinations thereof.

Figure 5:
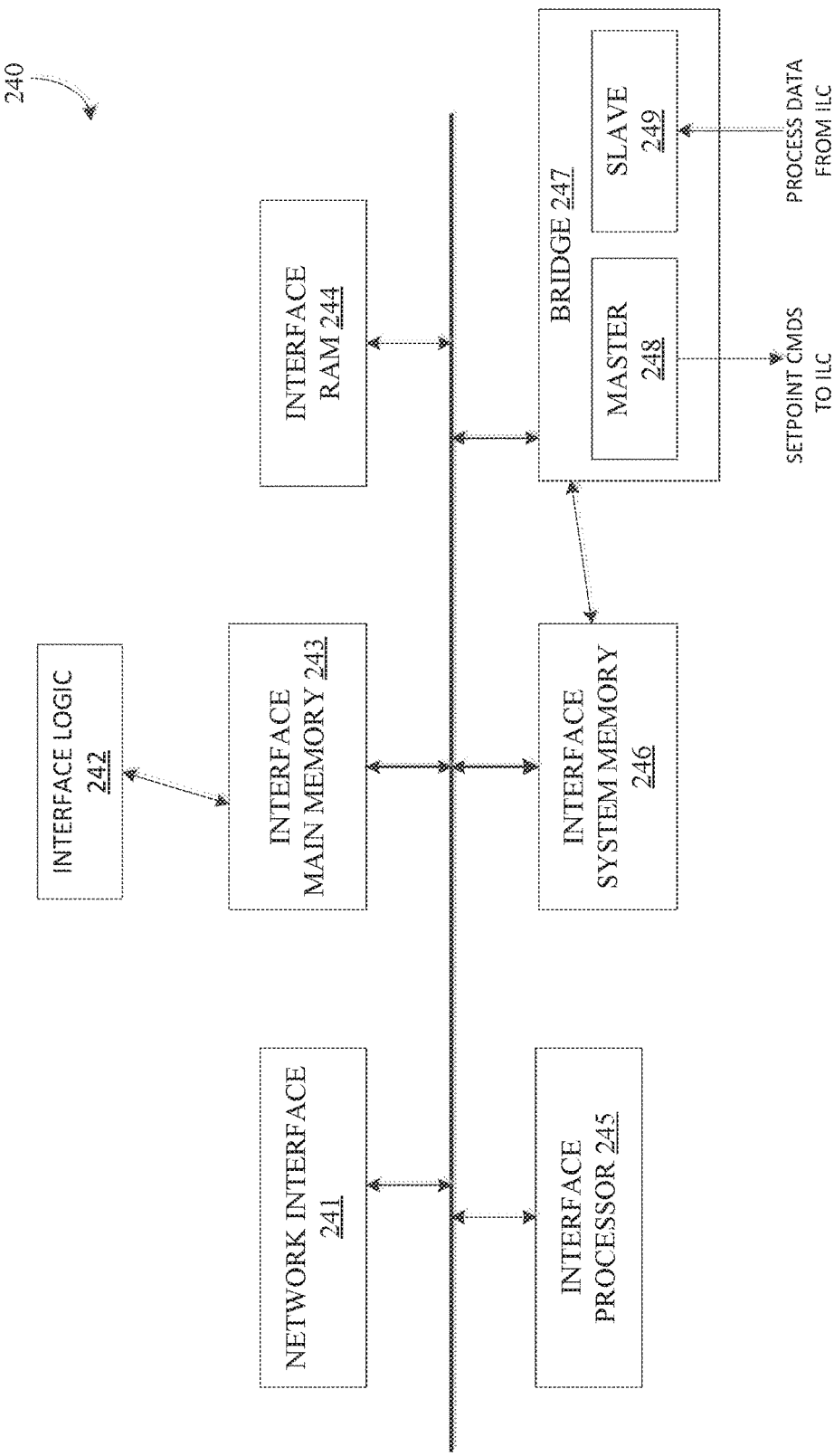
FIG. 5 shows a block diagram of an interface controller in accordance with an embodiment of the disclosure.

FIG. 5 illustrates an interface controller 240 in accordance with an embodiment of the disclosure. The interface controller 240 may include one or more of a network interface 241, an interface main memory 243, an interface RAM 244, an interface processor 245, an interface system memory 246, and an interface bridge 247. The interface controller 240 is exposed to the communication network 207 via the network interface 241. Unlike the system shown in FIG. 1, the system components of the interface controller 240 are separate from, and are not shared by, the ILC 220. The interface processor 245 executing the interface logic 242 parses the control commands received over the communication network 207 into command elements that can be sent to the ILC 220. In one embodiment the command elements are the smallest definable command elements that can be provided to the ILC 220 across the bridge 208.

Embodiments of the interface controller 240 act as a front-end processor for the ILC 220 by handling all network traffic. The interface controller 240 may support a variety of ICS protocols, including without limitation Common Industrial Protocol (CIP), EtherNet/IP, ControlNet, DNP3 and Modbus. In various embodiments the interface controller 240 may be configured to be part of a publish/subscribe communication network and/or a polling communication network. Control commands received by the interface controller 240 may include without limitation one or more of process controls, supervisory controls, and setpoint controls.

In one embodiment, the interface controller 240 may be configured to map and store process data received from ILC 220. If the interface controller 240 receives requests for process data, the network interface 241 is configured to encapsulate the stored process data according to an appropriate protocol and send it to the requester. Based on the protocol the interface controller 240 may also publish data to the network.

Figure 6:
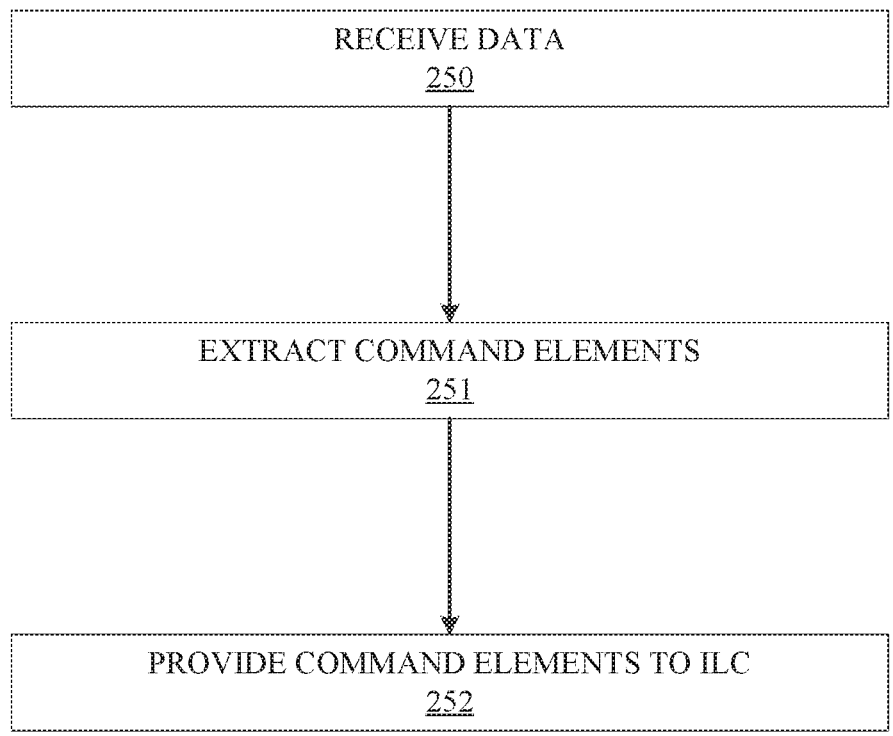
FIG. 6 shows a flow chart of a method of operation of an interface controller in accordance with an embodiment of the disclosure.
Figure 7:
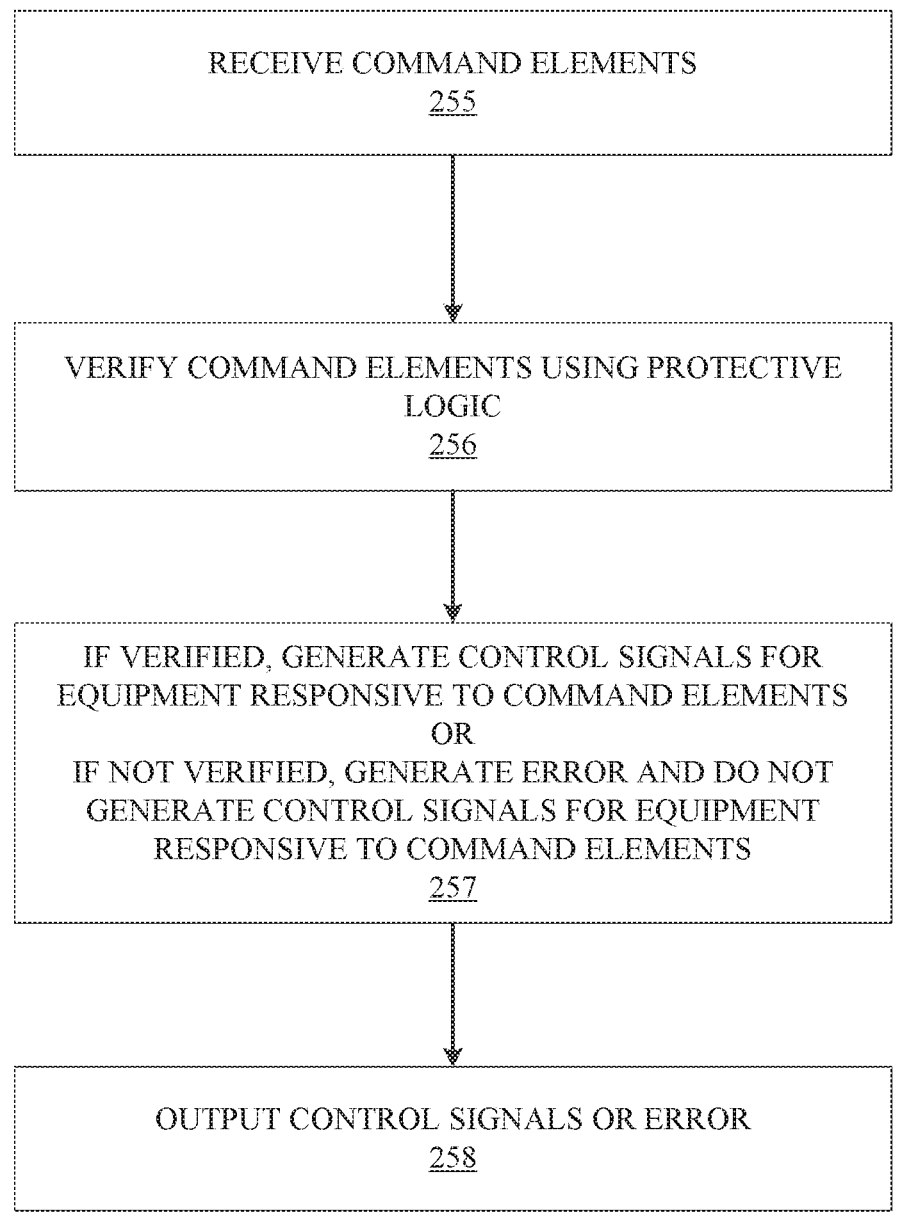
FIG. 7 shows a flow chart of a method of operation of an isolated logic controller in accordance with an embodiment of the disclosure.

FIGS. 6 and 7 show operation of an interface controller 240 and an ILC 220, in accordance with an embodiment of the disclosure. In FIG. 6, one or more data packets are received by the interface controller 240 in operation 250. In one embodiment, the data packets include one or more control commands or one or more parts of a control command related to one or more equipment 201. The interface controller 240 extracts one or more command elements from the data packet in operation 251. In one embodiment the one or more command elements may be the smallest definable control command elements supported by the bridge 208. The interface controller 240 makes the one or more command elements available to the ILC 220 in operation 252 via the interface bridge 247. In one embodiment, the one or more command elements are stored at one or more storage memories accessible by the ILC 220 via the bridge 208.

Turning to FIG. 7, the ILC 220 receives the one or more control elements in operation 255 via the ILC bridge 221. The ILC 220 verifies each control elements responsive to analysis performed by the ILC processor 229 executing the protective logic 225, in operation 256. The ILC 220 generates one or more control signals 203 for equipment 201 responsive to verification of a control element. In one embodiment, the ILC 220 may be configured to generate an error responsive to a failure to verify a conditioned command (and does not generate control signals for the equipment 201), in operation 257. The ILC outputs the one or more control signals to equipment 201 in operation 258. In one embodiment, the ILC 220 transmits an error to the interface controller 240, which packetizes data indicative of the error and communicates the packetized data responsive to the interface processor 245 executing the interface logic 242, by way of non-limiting example, to a supervisory control SC 210. In other embodiments the ILC 220 may be configured to communicate with supervisory control SC 210 via a one-way communication port, and communicates the error directly to the supervisory control via the one-way communication port.

Figure 8:
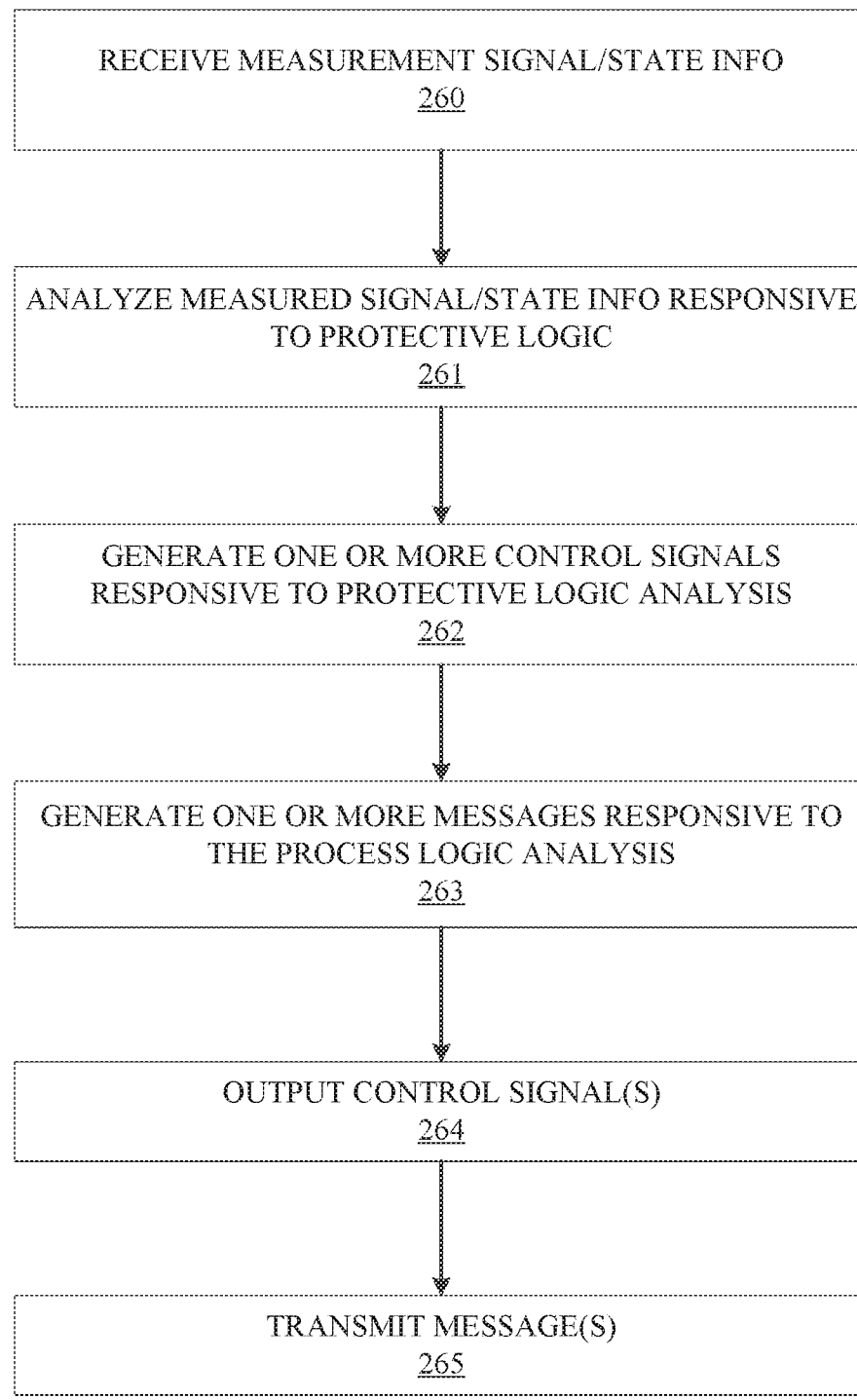
FIG. 8 shows a flow chart of a method of operation of an isolated logic controller in accordance with an embodiment of the disclosure.
Figure 9:
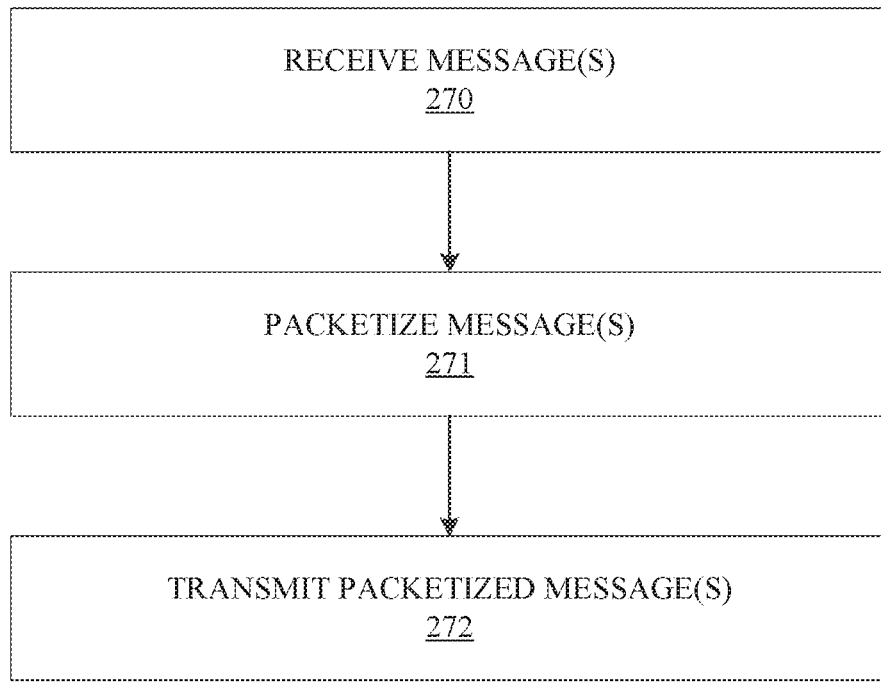
FIG. 9 shows a flow chart of a method of operation of an interface controller in accordance with an embodiment of the disclosure.

FIGS. 8 and 9 show operation of the interface controller 240 and ILC 220, in accordance with a further embodiment of the disclosure. The ILC 220 receives one or more measurement signals 206 in operation 260. In various embodiments the measurement signal 206 may be indicative of a measured value of a process variable or a state of the equipment 201. The measurement signals 206 are analyzed by the ILC processor 229 executing the protective logic 225 in operation 262. The ILC 220 generates one or more control signals 203 responsive to the analysis performed by the ILC processor 229 executing the protective logic 225 in operation 263. The ILC 220 generates one or more messages responsive to the ILC processor 229 executing the process logic 226 in operation 262. The ILC 220 provides the control signals 261 to the equipment 201 in operation 264, and transmits the one or more messages to the interface controller 240 in operation 265. The one or more messages to the interface controller 240 may, by way of non-limiting example, comprise one or more of process data, state information about the controller and equipment, security information, and the like.

Turning to FIG. 9, the interface controller 240 receives the one or more messages from the ILC 220 in operation 270. The interface controller 240 packetizes one or more of the received messages in operation 271. In one embodiment, the interface controller 240 packetizes the received messages responsive to an interface logic 242 stored on the interface main memory 243 and executed by the interface processor 245. The interface logic 242 may be software to manage communication among the control system 200, for example, rules engines for providing information and real-time data to other workstations or devices in or connected to the control system 200. In one embodiment, the interface logic 242 may include a rules engine for indicating addresses of devices in a network that should receive packetized messages. The packetized messages may be transmitted responsive to the interface logic 242 in operation 272.

Figure 10:
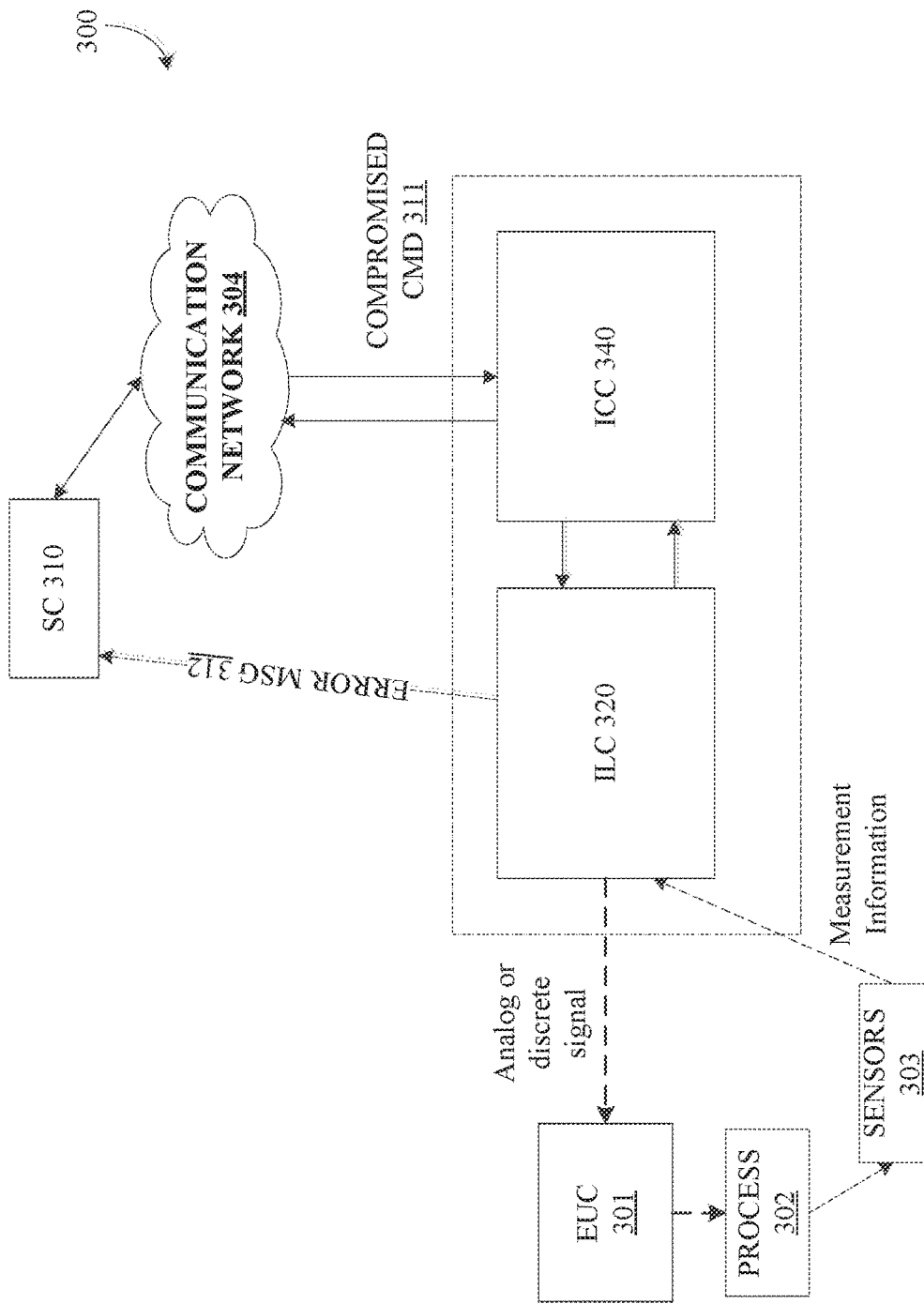
FIG. 10 shows a block diagram of a control system in accordance with an embodiment of the disclosure.

FIG. 10 illustrates an industrial control system (ICS) 300 in accordance with an embodiment of the disclosure. The ICS 300 includes a supervisory control (SC) 310, an ILC 320, an isolated communications controller (ICC) 340, equipment under control (EUC) 301, one or more processes 302, and one or more sensors 303. The ICS 300 may also include a communication network 304.

Various embodiments of the ICS 300 control the operation of the EUC 301, and, by controlling the EUC 301 the various processes 302. By way of non-limiting example, the infrastructure of the EUC 301 may control processes 302 ranging from turning on and off zones of a sprinkler to multiple computers, networks, and controllers for chemical processing, refining oil or processing wastewater.

The ILC 320 may be one or more of a PLC, RTU, IED, PAC, or a controller used in specialized applications such as building controls, avionics, healthcare, etc.

Figure 11:
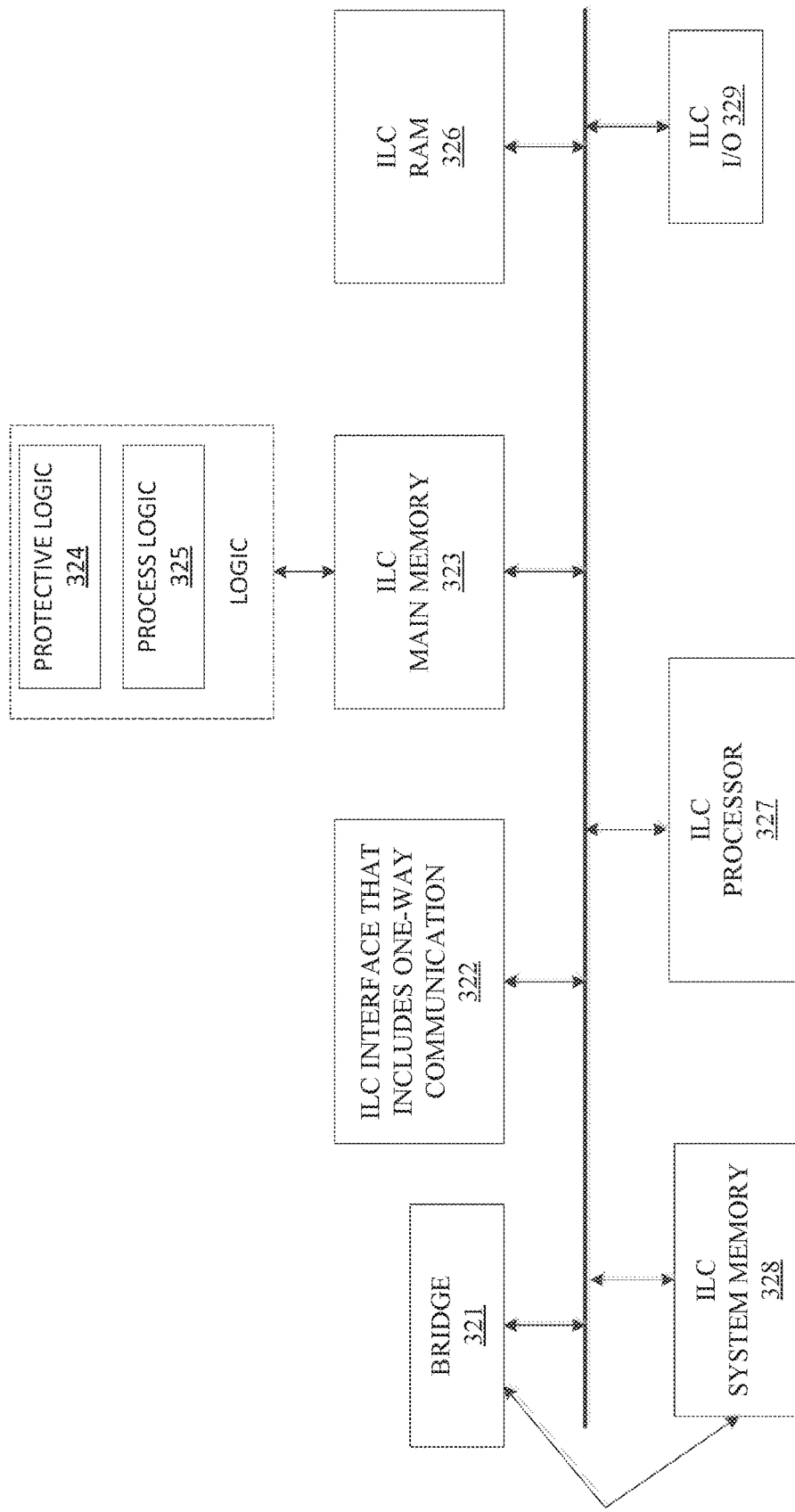
FIG. 11 shows a block diagram of an isolated logic controller in accordance with an embodiment of the disclosure.

FIG. 11 illustrates an ILC 320 in accordance with an embodiment of the disclosure. The ILC 320 includes an ILC bridge 321, and ILC interface 322, an ILC main memory 323, an ILC RAM 326, and ILC processor 327, an ILC system memory 328, and an ILC I/O 329. The ILC interface 322 may include a one-way communication port configured for communication with the SC 310. The one-way communication port facilitates unidirectional communication from the ILC 320 to the SC 310. In one embodiment, the communication port may be an analog output wired to the SC 310 to carry analog signals. In other embodiments the communication port may be a network port, for example, operating using TCP/IP including client/server proxies. In one embodiment, the communication port may be a network appliance, such as a data diode, that is part of a unidirectional network that permits data to travel only in one direction—from the ILC 320 to the SC 310. In various embodiments the ILC 320 may send messages directly to the SC 310 over the one way communication port while preventing attacks on the ILC 320 from the SC 310. The data may include one or more error messages 312 responsive to compromised commands 311 received over the communication network 304 from the SC 310. In one embodiment, the SC 310 may be configured to perform mitigation, vulnerability assessment, and intrusion detection processes responsive to receiving the error message 312. By way of non-limiting example, the SC 310 may be configured to take itself "offline," and transfer supervisory control to a back-up or other device and perform vulnerability assessment and intrusion detection.

Figure 12:
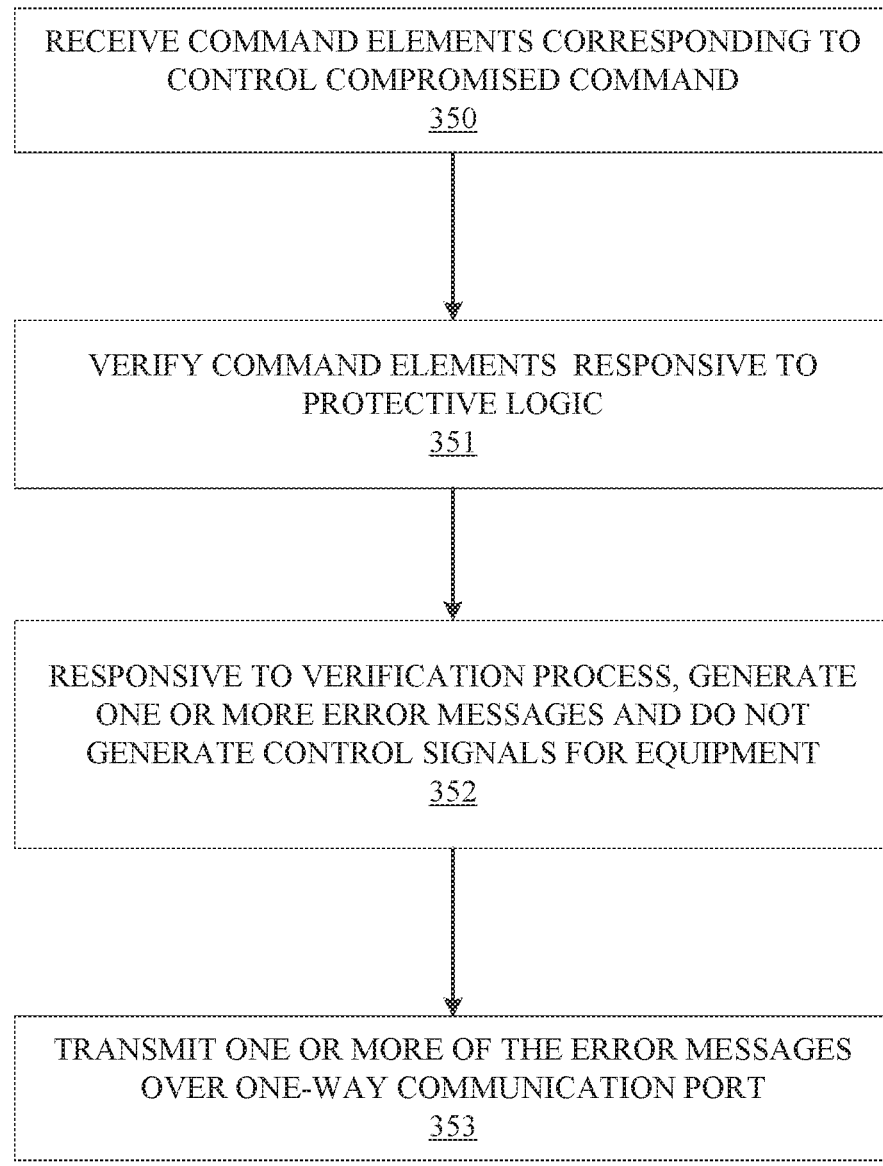
FIG. 12 shows a flow chart of a method of operation of an isolated logic controller in accordance with an embodiment of the disclosure.

FIG. 12 shows an operation of the ILC 320 in accordance with an embodiment of the disclosure. The ILC 320 receives a conditioned command from the ICC 340 in operation 350. In this example, the conditioned command is indicative of a compromised command 311 received by the ICC 340. The compromised command 311 may include one or more commands related to the EUC 301 and/or processes 302 that, if executed, may cause the EUC 301 to operate outside its operational boundaries, impair one or more of the operations 350, or result in an unsafe condition. A verification is performed responsive to the ILC processor 327 executing the protective logic 324 in operation 351. Responsive to the verification process, the ILC 320 may generate one or more error messages 312 indicative of the conditioned command or the control operations that would be performed on the EUC 301, in operation 352. The ILC interface 322 transfers one or more of the error messages 312 over the one-way communication port to the SC 310 in operation 353.

Figure 13:
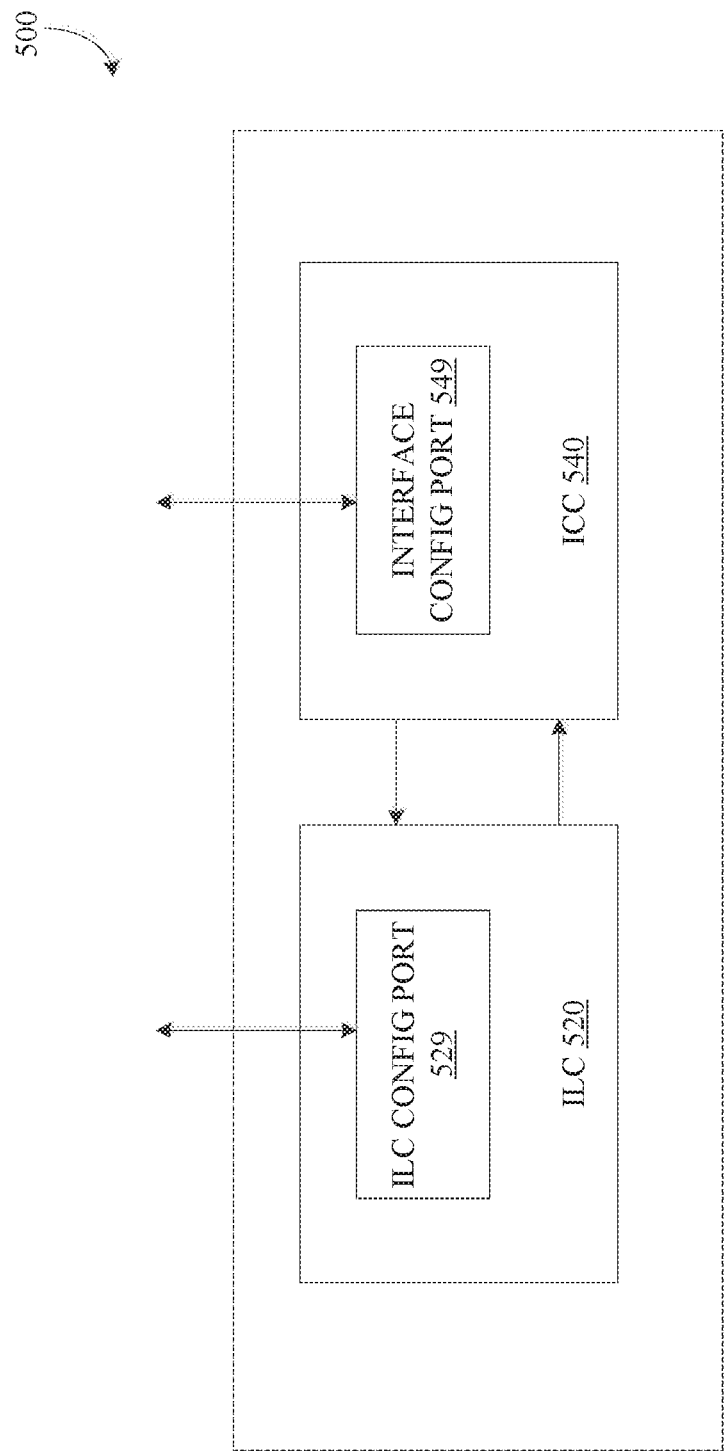
FIG. 13 shows a block diagram of an isolated logic controller and an interface controller in accordance with an embodiment of the disclosure.

FIG. 13 illustrates a controller 500 in accordance with an embodiment of the disclosure. The controller 500 includes an ILC 520 and an ICC 540. Each of the ILC 520 and ICC 540 includes a configuration port: the ILC configuration port 529 and the interface configuration port 549. The configuration ports 529 and 549 enable separate access to the ILC 520 and the ICC 540 for independent configuration. The ILC configuration port 529 is isolated from network access. By way of non-limiting example, configuration may include one or more of installing or updating software and/or firmware (including without limitation the control process logic 325 and protective logic 324 of FIG. 11), activating inputs/outputs, activating ports, and the like. In one embodiment, a configuration tool (e.g., a laptop) may be physically coupled to the ILC configuration port 529 or interface configuration port 549.

Figure 14:
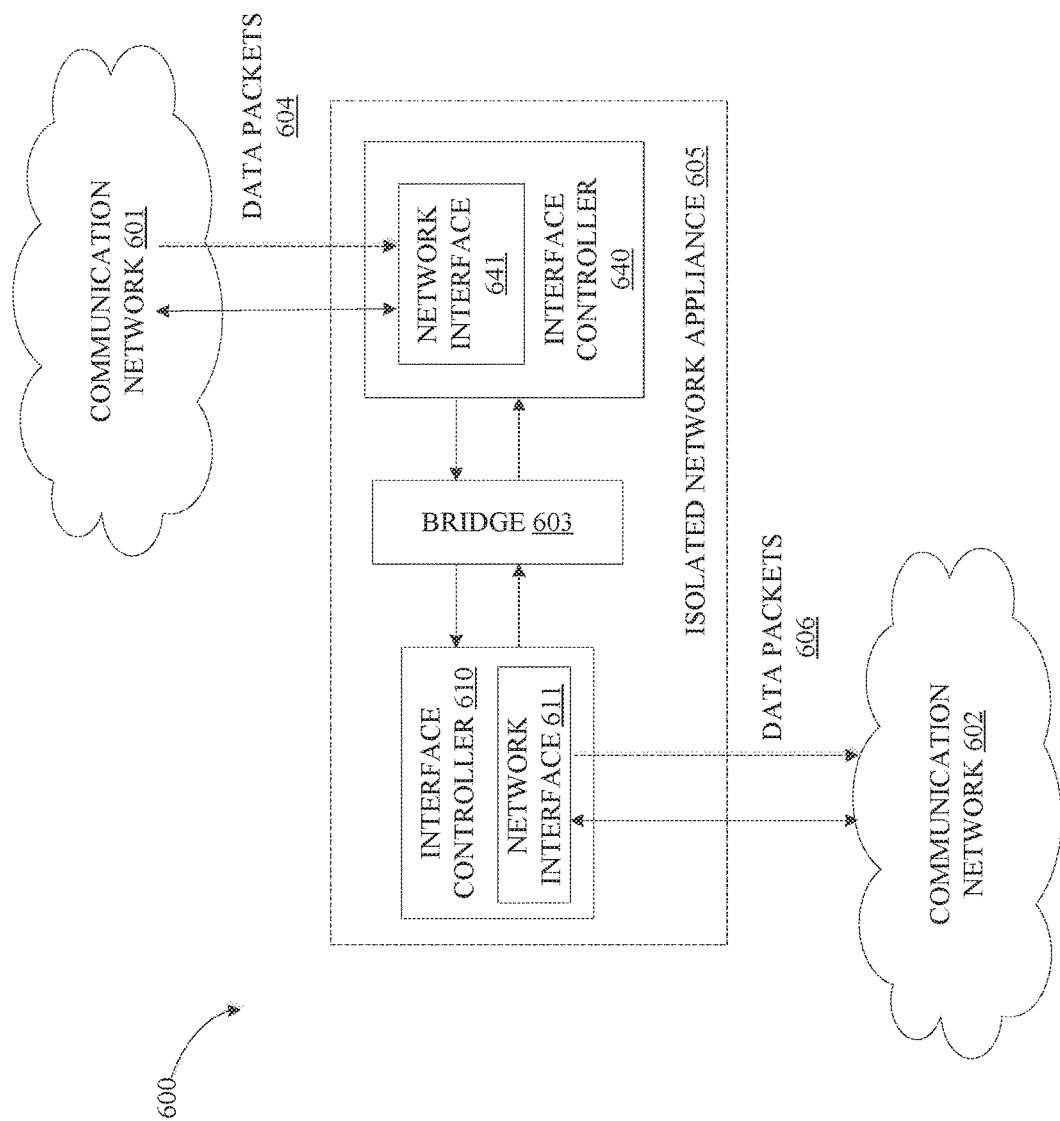
FIG. 14 shows a block diagram if an isolated network appliance in accordance with an embodiment of the disclosure.

FIG. 14 illustrates a system 600 that includes communication network 601, communication network 602, and isolated network appliance (INA) 605, according to an embodiment of the disclosure. The INA 605 includes interface controller 610 and interface controller 640, which coupled by, and communicate by, bridge 603. In one embodiment, the bridge 603 facilitates communication between the interface controllers 610 and 640 in substantially the same manner as the bridge 208 illustrated in FIG. 3.

INA 605 facilitates packet level communication between communication network 601 and communication network 602. Interface controller 610 include network interface 611 that receives/transmits data packets 606 from/to communication network 602. Interface controller 640 include network interface 641 that receives/transmits data packets 604 from/to communication network 601.

In one embodiment communication network 601 and communication network 602 may use different protocols and INA 605 may be a gateway that interfaces between the two communication networks. In this embodiment, each of interface controller 640 and 610 may include devices to provide system interoperability, including by way of non-limiting example, one or more of protocol translation, rate conversion, translation/mapping, impedance matching, and the like. In one embodiment, each interface controller 610 and 640 is configured to extract the smallest definable elements needed for communication between the communication network 601 and 602. By way of non-limiting example in the case of transmission control protocol (TCP), the address and payload segments may be extracted and transferred via bridge 603. In one embodiment, rate and other information may also be determined and provided. In one embodiment, the bridge 603 is configured to transfer only the necessary segments. Each interface controller 610 and 640 is configured to complete the translation/conversion process responsive to the received segments and/or information, to facilitate packet level communication.

In various embodiments, the smallest definable elements may be a design characteristic built into the architecture or configuration of a bridge 603. In this manner, unless an attacker is aware of the particular design of bridge 603 then it will be difficult, if not impossible, for an attacker to manipulate the INA 605.

In another embodiment, communication network 601 and communication network 602 communicate using the same protocol and INA 605 may be a router facilitating communication between the two communication networks. In one embodiment, each of the interface controllers 610 and 640 are configured to extract the smallest definable elements of the data packets and transfer those elements via the bridge 603. Each of the interface controllers 610 and 640 are further configured to packetize the smallest definable elements and transfer the resulting data packets across a communication network.

In yet another embodiment the INA 605 may be a network bridge appliance and the communication network 601 and communication network 602 may be network segments communicating as a single aggregate network.

Figure 15:
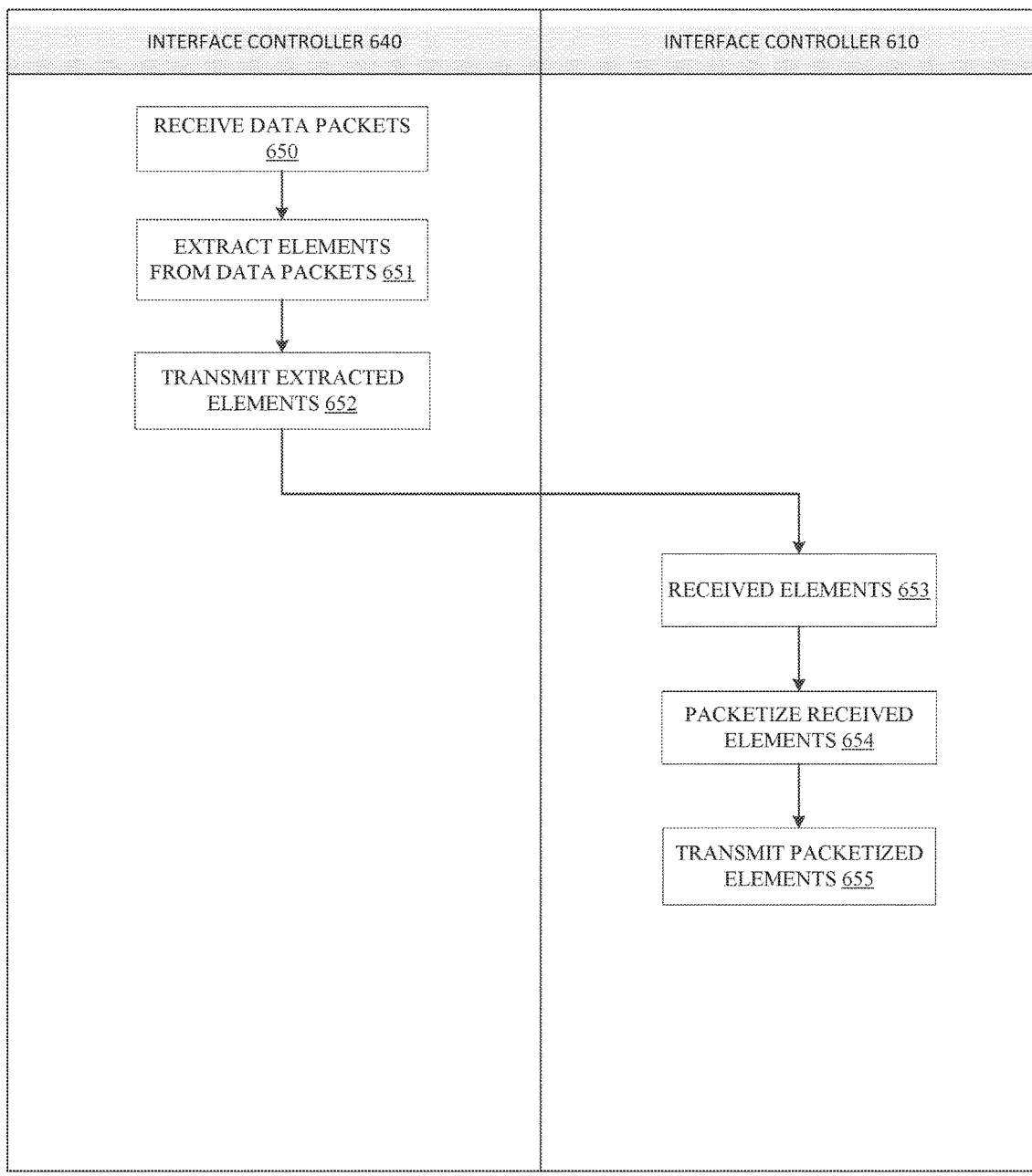
FIG. 15 shows a flow chart of a method of operation of an isolated network appliance in accordance with an embodiment of the disclosure.

FIG. 15 illustrates the operation of an INA 605 according to an embodiment of the disclosure. Data packets are received at the interface controller 640 from the communication network 601 in operation 650. The interface controller 640 extracts the smallest definable elements from the data packets in operation 651 and transmits those extracted elements to the interface controller 610 in operation 652. The interface controller 610 receives the transmitted elements in operation 653, and packetizes those received elements in operation 654. The interface controller 640 transmits the packetized elements in operation 655. Transmission from the interface controller 610 to the interface controller 640 incorporates similar operations.

Various embodiments of the interface controllers 640 and 610 may include a configuration port to enable separate access to the interface controllers for independent configuration. The implementation of the configuration ports may be similar to configuration ports 529 and 549 described with reference to FIG. 13. The configuration ports are isolated from network access. By way of non-limiting example, configuration may include one or more of installing or updating software and/or firmware (including without limitation the control process logic and protective logic), activating inputs/outputs, activating ports, and the like. In one embodiment, a configuration tool (e.g., a laptop) may be physically coupled (e.g., by a cable) to a configuration port.

The architectures described relating to the various embodiments disclosed herein isolate the logic implemented in controllers that are part of industrial control systems, and protect the processes, equipment and people from the impact of attacks. By way of non-limiting example, embodiments of the disclosure may find application in controllers used to control and monitor transportation systems (train, aviation, marine, pipeline, etc.), energy generation (hydro, nuclear, coal, gas, wind, etc.), building automation, water systems (transmission, treatment and distribution), wastewater treatment (collection and treatment), chemical plants, oil refining, mining operations, electrical transmission and distribution systems, manufacturing systems (automobiles, consumer goods, capital products), food processing facilities, etc.

The attack surface for supervisory issued commands is broad and exploitable. The workstations and computer in supervisory control may be compromised and masquerade as a legitimate node while issuing malicious commands. Further, supervisory commands can be intercepted and modified. It is now understood that system complexity can also increase the attack surface, giving a threat actor more options for exploiting the control system. It is now understood that simple ICS architectures are easier to defend than complex system architectures.

The various embodiments disclosed herein may incorporate robust protective logic. In one embodiment, control aspects included in the supervisory command level may be moved into the protective logic of an isolated logic controller. Further, the protective logic may incorporate one or more of predictive algorithms, machine learning, neural networks, artificial intelligence, and guided artificial intelligence.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. The present system may utilize any number of transport protocols, including, without limitation User Datagram Protocol (UDP), Transmission Control Protocol (TCP), Venturi Transport Protocol (VTP), Datagram Congestion Control Protocol (DCCP), Fibre Channel Protocol (FCP), Stream Control Transmission Protocol (SCTP), Reliable User Datagram Protocol (RUDP), and Resource ReSerVation Protocol (RSVP). For wireless communications, communications protocols may include Bluetooth, Zigbee, IrDa or other suitable protocol. Furthermore, components of the system may communicate through a combination of wired or wireless paths.

Memories used to store signals or data as described herein, such as ILC main memory 224 and interface main memory 243, may be arranged inside and outside a computer. For example, in a network, the system memory may include (or be part of) a distributed storage system that provides both storage and file-system, such as network-attached-storage (NAS), or a distributed storage system that provides only storage, such as a storage-area-network (SAN). In the case of NAS, it may include software capable of file management services, including, without limitation, FreeNAS™, NASLite™, and NexentaStor™. The NAS may contain one or more hard disks, arranged into logical, redundant storage containers or RAID arrays. The NAS may utilize use one or more file-based protocols including, without limitation, Network File System (NFS), Windows NT™ File System (NTFS), File Allocation Table (FAT), Server Message Block/Common Internet File System (SMB/CIFS), or Apple Filling Protocol (AFP).

The information stored on a memory may be stored in a database. The particular architecture of the database may vary according to the specific type of data, mode of access of the data, or intended use of the data stored in the database; including, without limitation, a row-oriented data-store architecture, a column-based database management system, extensible-markup language, a knowledgebase, a frame database, or combinations thereof. A database management system (DBMS) may organize the storage of the data in the database, tailored for the specific requirements of the present system. The DBMS may use any number of query languages to access the database, including, without limitation, structured query language (SQL). In the case of SAN, embodiments of the invention may use any number of protocols to communicate between server and storage, including, without limitation, the SCSI protocol, HyperSCSCI protocol, iSCSI protocol, ATA over Ethernet, Fibre channel Protocol, and Fibre Channel over Ethernet.

Although the various embodiments describe one ILC coupled to one interface controller, one of ordinary skill in the art will recognize that, consistent with the advantages described herein, additional ILC's and interface controllers could be added. In one embodiment, two or more interface controllers may be cascaded or connected in series.

The logic processes included in the ILC may be divided among two or more ILC systems. In one embodiment, the process logic and the protective logic may be in two ILC's, coupled together.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention. As such, the invention is not to be defined only by the preceding illustrative description, but only by the claims which follow, and legal equivalents thereof.

I claim:

1. A control system, the system comprising:
   an interface controller configured to receive one or more control commands over a network interface;
   a logic controller configured to provide one or more control signals to equipment; and
   a bridge interface coupling the interface controller and logic controller and isolating the logic controller from the network interface.

2. The control system of claim 1, wherein the bridge interface comprises one or more master/slave connections that each facilitate unidirectional communication between the interface controller and the logic controller.

3. The control system of claim 1, wherein the interface controller is configured to:
   parse the one or more control commands to extract at least one control element; and
   provide the control element to the logic controller over the bridge interface.

4. The control system of claim 3, wherein the control element is less than the whole of the control command.

5. The control system of claim 3, wherein the control element is the smallest definable element of the control command.

6. The control system of claim 1, wherein one or more components of the logic controller are not accessible by the network interface.

7. The control system of claim 1, wherein the interface controller comprises at least one component directly accessible by the bridge interface.

8. The control system of claim 1, wherein the logic controller comprises at least one component directly accessible by the bridge interface.

9. The control system of claim 1, further comprising one or more equipment coupled to the logic controller and configured to perform one or more operations responsive to receiving one or more control signals from the logic controller.

10. The control system of claim 1, wherein the one or more equipment is configured to perform operations to control one or more changeable processes.

11. The control system of claim 1, further comprising a second interface controller coupled to the interface controller.

12. A control system, the system comprising:
    a first interface controller configured to receive one or more data packets over a first network interface;
    a second interface controller configured to receive one or more data packets over a second network interface; and
    a bridge interface coupling the first interface controller and the second interface controller and isolating the first interface controller from the second network interface and isolating the second interface controller from the first network interface.

13. The control system of claim 12, wherein the first network interface is configured for a first protocol and the second network interface is configured for a second protocol.

14. The control system of claim 12, wherein the first interface controller is configured to extract smallest definable elements from a data packet and transmit the extracted elements by the bridge interface.

15. The control system of claim 14, wherein the bridge interface is configured to transmit only elements that correspond to the smallest definable elements.

16. The control system of claim 4, wherein the second interface controller is configured to packetize the extracted elements and transmit the packetized elements.

* * * * *